(12) United States Patent
Hughes

(10) Patent No.: US 7,875,113 B2
(45) Date of Patent: Jan. 25, 2011

(54) CONCRETE COMPOSITIONS

(76) Inventor: Felix Hughes, 1 Lodge Lane, Chalfont St. Giles, Buckingham (GB) HP8 4AQ ( * ) Notice: Subject to any disclaimer, the term of this patent is extended or adjusted under 35 U.S.C. 154(b) by 817 days.

(21) Appl. No.: 11/761,035

(22) Filed: Jun. 11, 2007

(65) Prior Publication Data

US 2008/0072800 A1 Mar. 27, 2008

(30) Foreign Application Priority Data

Sep. 21, 2006 (GB) ................................. 0618625.8
Apr. 13, 2007 (GB) ................................. 0707179.8

(51) Int. Cl.
*C04B 7/13* (2006.01)
(52) U.S. Cl. ...................... 106/644; 106/705; 106/713; 106/718; 106/724; 106/737; 106/823; 106/DIG. 1
(58) Field of Classification Search ................ 106/644, 106/705, 713, 718, 724, 737, 823, DIG. 1
See application file for complete search history.

(56) References Cited

U.S. PATENT DOCUMENTS 7,494,543 B2 * 2/2009 Hughes ...................... 106/644

2006/0207479 A1 9/2006 Hughes

FOREIGN PATENT DOCUMENTS

JP 7-330414 12/1995
WO WO-2004/076376 9/2004

* cited by examiner

*Primary Examiner*—Paul Marcantoni
(74) *Attorney, Agent, or Firm*—Stites & Harbison PLLC; Marvin Petry

(57) ABSTRACT

A concrete obtained through mixing a composition comprising the following constituents: a) 21 to 27% of a hydraulic binder, b) 52 to 68% of aggregate particles having a size of between 0.02 mm and 5 mm, c) 2 to 6% of pozzolanic reaction particles having a particle size of between 0.1 and 1 micron, d) up to 10% of filler having a particle size between 10 and 200 microns, e) 0.32 to 1.6% of a dispersant, f) 0.1 to 1.2% of fibres, g) 0.02 to 0.1% of a defoamer agent, and h) 7 to 10% of water, each percentage being the percentage by weight of the respective constituent relative to the sum of the weights of constituents a) to h). The concrete obtained is particularly suitable for polished flooring overlay.

23 Claims, No Drawings

CONCRETE COMPOSITIONS

BACKGROUND TO THE INVENTION

Field of the Invention

The invention relates to a concrete composition.

Concrete compositions have typical uses in construction. They have not previously been used or used extensively for decorative articles. For such articles, such as flooring, marble, granite and natural stone flooring are used, for example, and are often very expensive. Their mechanical properties are often not ideal for flooring—they cannot be moulded and flexural and compressive strengths are variable and often insufficient. It is therefore desirable to use a material that is cheaper to manufacture, has good mechanical, machining and cutting properties, a high flexural and compressive strength, a low permeability and an aesthetically pleasing finish.

SUMMARY OF THE INVENTION

In accordance with the present invention, there is provided a concrete obtained through mixing a composition comprising the following constituents:
a) 21 to 27% of a hydraulic binder,
b) 52 to 68% of aggregate particles having a size of between 0.02 mm and 5 mm,
c) 2 to 6% of pozzolanic reaction particles having a size of between 0.1 and 3 microns,
d) up to 10% of filler having a particle size between 10 and 200 microns,
e) 0.32 to 1.6% of a dispersant,
f) a weight of fibres such that the volume of fibres in the composition is 0.1 to 1.2% of the total volume of the composition,
g) 0.02 to 0.1% of a defoamer agent, and
h) 7 to 14% of water, each percentage being the percentage by weight of the respective constituent relative to the sum of the weights of constituents a) to h). There is further provided a method of making such a concrete.

DESCRIPTION OF THE PREFERRED EMBODIMENTS

The following is a more detailed description of a preferred embodiment of the invention with reference to examples, the invention not being limited to the embodiment or examples described.

The constituents from which the concrete composition is made include a hydraulic binder, aggregate particles, pozzolanic reaction particles, a foam control agent, a dispersant, water, and a reactive and/or inert filler. In the preferred embodiment, further constituents include pigment, anti-shrinkage agent and the dispersant comprises two superplasticizers. The anti-shrinkage agent may be used in an amount to control shrinkage of the composition. The dry dosage rate of such an agent may be between 0.5% and 5% by mix weight. A suitable anti-shrinkage agent is sold by Munzing Chemie GmbH under the trade name METOLAT 871 and a suitable defoamer is sold under the trade name AGITANP801 by the same company.

The hydraulic binder is 21 to 27%, preferably in this range above 22%, more preferably above 23%, and preferably below 26%, more preferably still below 25%, by weight of the weight of the sum of the constituents and is of the Portland cement type or a similar type. The hydraulic binder is preferably Portland cement type 52.5 or 42.5. Such a cement can be selected according to colour. If grey cement is selected, suitable cement is Castle Rapid Hardening Cement, which is supplied by Castle Cement. If white cement is selected, a suitable cement is Paragon Super White supplied by Cimsa, Turkey through Aggregate Industries plc.

The aggregate particles are 52 to 68% by weight of the sum of the weights of the constituents and preferably in this range above 54%, more preferably above 56%, more preferably still above 58% and yet more preferably still above 59%. In this range, the aggregate particles are preferably below 56%, more preferably below 54%, more preferably still below 52% and yet more preferably still below 51% by weight of the sum of the weights of the constituents. The aggregate particles comprise particles of size substantially ranging from 0.02 mm to 0.5 mm, and in this range are preferably above 0.05 mm, more preferably above 0.1 mm, more preferably still above 0.5 mm, and yet more preferably still above 1 mm. In this range the particles are preferably below 4.5 mm, more preferably below 4 mm, more preferably still below 3.5 mm, and yet more preferably still below 3 mm. The particles are generally rounded and generally do not have sharp points or edges. The particles are selected from at least one, preferably at least two, more preferably still at least three and up to five particles of the following sizes:
(a) 2 mm to 5 mm,
(b) 1 mm to 2 mm,
(c) 0.25 mm to 0.75 mm,
(d) 0.1 mm to 0.3 mm, and
(e) 0.01 mm to 0.2 mm.

Sizes of particles are to be herein understood throughout at the length of the longest dimension of a particle. In this embodiment the particles are selected from silica sand products, but the particles in each size range can be partially or wholly substituted with products of a similar size range made of, for example, waste glass, granite sands, bauxite, basalt, river rock, garnet, topaz and silicon carbide.

The pozzolanic reaction particles are, for examples, fumes produced in the silicon and zirconium industries for microsilicas, in addition to or in combination with calcined kaolin (metakaolin). The pozzolanic reaction particles react chemically in the presence of moisture with the hydraulic binder to form compounds with cementitious properties. Including the pozzolanic reaction particles in the composition increases the compressive and flexural strengths of the concrete and reduces permeability, which results in a higher density concrete having improved mechanical, machining and cutting properties relative to conventional materials. If metakaolin is used as the sole reaction particles, there is improved early strength in comparison and microsilica since it has a higher reactivity index than microsilica and gives improved travelling characteristics over microsilica. Similar benefits are obtained by incorporating the metakaolin with microsilica at ratios of 1:1 to 1:2 within the overall pozzolanic inclusion in the mix. The pozzolanic reaction particles comprise between 2 and 6%, preferably above 3%, more preferably above 3.5%, and more preferably still above 3.8% by weight of the sum of the weights of the constituents. The pozzolanic reaction particles preferably comprise less than 5%, more preferably below 4.5% and more preferably still below 4.2% by weight of the sum of the weights of the constituents. The particles have size ranging from 0.1 micron to 31 microns. Suitable pozzolanic materials are sold by Imerys and Elkem Materials, for example.

The composition comprises 7 to 14% water. The quantity of water added to the concrete composition is adjusted according to the characteristics of the other constituents—for example, depending upon the moisture content of any of the other constituents of the composition or the intended application of the concrete, and adjustment thereof is known in the art.

The filler is up to 10% by weight of the sum of the weights of the constituents, is preferably in this range above 1%, more preferably above 2%, more preferably still above 3%, and is preferably in this range below 9%, more preferably below 8%, more preferably still below 7%. The filler is a pozzolanically reactive filler or an inert filler or a mix thereof, and comprises particles of size substantially ranging from 10 to 200 microns.

The pozzolanically reactive filler, if included, is a third material of pozzolanic nature and also reacts with the hydraulic binder in the presence of moisture to form compounds having cementitious properties. The use of such material results in the concrete having a higher compressive and flexural strength and reduces permeability. Reducing permeability results in a denser concrete with improved finishing properties such a fewer pock marks and a more aesthetically pleasing finish.

A suitable inert filler is, for example, glass, silicon carbide and stone powders such as limestone, granite and bauxite. The inert filler fills pore space with solid particles rather than water, thereby reducing the amount of water required per unit quantity of hydraulic binder. The strength is increased as the water required per unit quantity is reduced. Both reactive and inert fillers add fluidity to the composition, which aids mixing and moulding, and reduces the overall cost of the composition.

The fibres are made of polyvinylalcohol (PVA) and comprise between 0.1% and 1.2% by volume of the composition, preferably above 0.2%, more preferably above 0.3%, more preferably still above 0.4% and yet more preferably still above 0.5%. The fibres preferably comprises below 1.1%, more preferably below 1.0%, more preferably still below 0.9% and yet more preferably still below 0.8% by weight of the sum of the weights of the constituents. The fibres have cross-sections of 0.027 mm or 0.04 mm in diameter. Fibres of such diameters are selected in part at least for invisibility in the finished concrete. The fibres are selected from fibres having cut lengths of 4, 6, 8, and 12 mm. Fibres of at least two cut lengths are preferably selected. Use of fibres strengthens and reinforces the concrete, and leads to reduced instances of cracking. Suitable fibres are available from Kuraray Co. Ltd of Japan. A suitable filler is sold under the trade name DOLO-FIL 100 by Omya UK. An alternative is a reactive silica filler material, Grade 74/200 from Boud Marketing.

The concrete composition comprises 0.32 to 1.6% of dispersant, preferably above 0.5%, more preferably above 0.7%, more preferably still above 0.8%, by weight of the sum of the weight of the constituents. The concrete composition preferably comprises below 1.4%, more preferably below 1.2%, more preferably still below 1.1%, and yet more preferably still below 1% of dispersant by weight of the sum of the weights of the constituents. The dispersant serves to improve fluidity and workability of the composition. The dispersant is (although it need not necessarily be) a superplasticizer and is added to the other constituents of the composition in combination with water. The dispersant can comprise more than one superplasticizer. In the preferred embodiment, the dispersant comprises two superplasticizers, one of which is based on modified phosphonates and one of which is based on polycarboxylates. The polycarboxylates based superplasticizer is employed as a high strength water reducer in the concrete composition. The modified phosphonates superplasticizer improves workability of the composition. The dispersants may also be deployed in powder form. A suitable superplasticizer is sold by BASF Construction Chemicals under the trade name MELFLUX2651F. A second superplasticizer base on modified phosphonates may be that sold under the trade name OPTIMA 206 by Chryso SAS. A workability agent based on a modified polyelectrolyte is available from BASF Construction Chemicals sold under the trade name STARVIS 3003F. A second agent, Optima 100, is available from Chryso. Both of these products reduce the possibility of segregation within the mix during, for example, pumping. They can also allow for over-dosing of water when mixing.

The concrete composition may include colorants to pigment the set concrete. The pigment can be selected from, for example, various natural and synthetic iron oxides, oxides of chromium, mixed metal oxides, cobalt and titanium oxides or a mixture thereof.

The concrete composition preferably includes a foam control agent (defoamer agent) to remove entrapped air leading to a concrete composition that can be pumped more efficiently and trowelled more easily. The agent comprises 0.03 to 0.01% of the concrete composition, by weight of the sum of the weights of the constituents. The agent also reduces entrapped and entrained air on setting of the composition, thereby improving strength properties, and improves impermeability due to a reduction of porosity.

The shrinkage agent compromises 0.05% to 5% inclusion per dry weight of mix to reduce the incidence of shrinkage leading to potential surface cracking.

A suitable anti-shrinkage agent is sold by Munzing Chemie GmbH under the trade name METOLAT 871 and a suitable defoamer is sold under the trade name AGITANP801 by the same company.

The concrete composition optionally includes a non-chloride set accelerator. Conditions under which it is appropriate to include such an accelerator are known in the art. Suitable accelerators are sold by BASF, Sika Limited and Chryso SAS.

The preparation of the concrete requires the following steps:

In a first step the hydraulic binder, the aggregate particles, the pozzolanic reactive particles, the filler, the foam control agent, the fibres, and, if desired, pigment are dry mixed together for one minute. A planetary, turbine, horizontal shaft or handheld paddle type mixer which provides a high shear is suitable for this purpose.

In a second step, the dispersant and water are added in combination to the mixture.

In a third step, the mix is mixed for up to eight minutes until the mix is substantially homogenous.

In a fourth step, if more fibre is desirable, more fibre is added and the mix is mixed for one to two minutes. The mixture obtained at the end of the fourth step is poured onto a substrate. It is also advantageous to carry out the fourth stage of mixing under a partial vacuum in order to assist the further removal of entrained and entrapped air within the mixed material thus reducing the potential for surface blemishes in the form of air bubbles.

The substrate may be such that the finished concrete is in the form of a slab or tile. Alternatively, the composition may be pumped or poured directly onto an immobile substrate such as a floor. Techniques using gauge rakes to prevent flow lines, feather edges, gauge rails, dappling beams and trowels are known in the art of applying such a composition. A curing agent is normally applied to the concrete surface before setting The set concrete has many advantages over known concretes and other materials typically used for flooring, although use of the set concrete is not limited to use as flooring. If the concrete composition is decanted on to an existing substrate to provide a new surface, the concrete, once set, would typically have a section of 3 to 25 mm width, but could be much thicker.

The concrete has a high flexural and compressive strength compared to conventional concretes and has excellent cutting, machining and finishing properties. The concrete also has a high resistance to abrasion and polishes to an aesthetically pleasing finish.

The concrete achieves these properties through the packing of the particles. As the hydraulic binder, aggregate, filler and pozzolanic reaction particles are of different sizes, the particles arrange themselves to be optimally packed for the strengths and properties mentioned.

Packing of the particles also allows for improved hydration of the composition during mixing, which results in a higher density concrete of low porosity with good impermeability. The use of the foam control agent (defoamer agent) further reduces porosity and concrete can therefore be made having a cross section which is substantially free of airholes. The packing of the particles results in concrete with excellent abrasion resistant properties when compared with conventional concretes.

The optimal packing of the particles also results in a concrete having low friability, which also allows the concrete to be easily machined, shaped and polished. The lack of airholes and low friability allows the possibility of machining and allows a substantially smooth cut surface, free of airholes, to be machined.

The fibres improve the flexural and compressive strengths of the concrete and also reduce friability. The concrete also has a high ductility relative to conventional concretes, natural stone, marble or granite permitting thin sections of the concrete to be laid on uneven surfaces with a reduced likelihood of cracking when compared to conventional concretes, natural stone, marble or granite.

When applied to a floor, the concrete is generally self-leveling. If a floor is not level, the viscosity of the composition can be manipulated to reduce the viscosity to prevent undesired flow of the composition.

Waste glass that is optionally used as an aggregate is advantageously recycled waste glass.

The concrete may be used in buildings with under floor heating systems. The concrete may be sold as a dry mix in suitable containers.

The concrete may be acid or polymer stained. The surface of the set concrete may advantageously have silicate treatment applied to aid polishing, thereby to result in a durable and aesthetically enhanced flooring concrete.

I claim:

1. A concrete obtained through mixing a composition comprising the following constituents:
   a) 21 to 27% of a hydraulic binder,
   b) 52 to 68% of aggregate particles having a size of between 0.02 mm and 5 mm,
   c) 2 to 6% of pozzolanic reaction particles having a size of between 0.1 and 3 microns,
   d) up to 10% of filler having a particle size between 10 and 200 microns,
   e) 0.32 to 1.6% of a dispersant,
   f) a weight of fibres such that the volume of fibres in the composition is 0.1 to 1.2% of the total volume of the composition,
   g) 0.02 to 0.1% of a defoamer agent, and
   h) 7 to 14% of water,
   each percentage being the percentage by weight of the respective constituent relative to the sum of the weights of constituents a) to h).

2. A concrete according to claim 1, wherein said filler comprises partially or wholly pozzolanic reactive particles, which react on mixing with said hydraulic binder.

3. A concrete according to claim 2 wherein the pozzolanic reactive particles include microsilicas.

4. A concrete according to claim 2 wherein the pozzolanic reactive particles include metakaolin.

5. A concrete according to claim 1, wherein said filler is partially or wholly an inert filler.

6. A concrete composition according to claim 1 wherein said dispersant comprises one or more superplasticizers.

7. A concrete composition according to claim 1 wherein said dispersant includes a superplasticizer based on modified phosphonates.

8. A concrete composition according to claim 1, wherein said dispersant includes a superplasticiser based on polycarboxylates.

9. A concrete according to claim 1 and further including an anti-shrinkage agent.

10. A concrete composition according to claim 9 wherein the anti-shrinkage agent is present in 0.5% to 5% of the mix weight.

11. A concrete according to claim 1, wherein the fibres are made of polyvinylalcohol.

12. A concrete according to claim 1, wherein said fibres have a length of between 2 mm and 14 mm.

13. A concrete according to claim 1, wherein said fibres are selected from cut lengths of 4, 6, 8, and 12 mm.

14. A concrete according to claim 1, wherein said fibres are less than 0.01 mm in diameter.

15. A concrete according to claim 1 wherein said aggregate particles comprise particles selected from at least one of the following particle size/ranges: 2 mm to 5 mm, 1 mm to 2 mm, 0.25 mm to 0.75 mm, 0.1 mm to 0.3 mm, and 0.01 mm to 0.2 mm.

16. A concrete according to claim 15, wherein said particles are selected from particles having at least two of said particle size ranges.

17. A concrete according to claim 15, wherein said particles are selected from particles having at least three of said three particle size ranges.

18. A concrete according to claim 1 and including a decolourant.

19. A prefabricated element for machining made of a concrete according to claim 1.

20. A method for producing the concrete according to claim 1 through mixing a composition comprising the constituents a) to h).

21. A method according to claim 20, wherein the hydraulic binder, aggregate particles, the pozzolanic reaction particles, the filler, the foam control agent, and at least a portion of the fibres are dry mixed together, then a combination of the water and the dispersant are added and mixed, and then the composition is decanted.

22. A method according to claim 21 wherein further fibres are added after the combination of water and the dispersant, and before decanting.

23. A method according to claim 19 and including the step of applying a partial vacuum to the composition to remove entrained and entrapped air within the composition.

* * * * *